United States Patent
Szedo et al.

(10) Patent No.: US 8,441,562 B1
(45) Date of Patent: May 14, 2013

(54) COLOR FILTER ARRAY ALIGNMENT DETECTION

(75) Inventors: Gabor Szedo, Longmont, CO (US); Jose R. Alvarez, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 356 days.

(21) Appl. No.: 12/875,077

(22) Filed: Sep. 2, 2010

(51) Int. Cl.
*H04N 5/335* (2011.01)

(52) U.S. Cl.
USPC .......................................... 348/280; 348/275

(58) Field of Classification Search .................. 348/272, 348/273, 275, 280
See application file for complete search history.

(56) References Cited

U.S. PATENT DOCUMENTS

| 3,971,065 A | 7/1976 | Bayer |
| 2007/0229684 A1* | 10/2007 | Lin ................................ 348/273 |
| 2010/0085452 A1* | 4/2010 | Hirakawa et al. ............. 348/273 |

OTHER PUBLICATIONS

Gunturk, et al., "Demosaicking: Color Filter Array Interpolation", IEEE Signal Processing Magazine, Jan. 2005, pp. 44-54.

* cited by examiner

*Primary Examiner* — Tuan Ho
(74) *Attorney, Agent, or Firm* — LeRoy D. Maunu (57) ABSTRACT

In one embodiment of the present invention, a method for determining a phase alignment of a Bayer color filter array is provided. A quincunx lattice of the color filter array corresponding to a first color component is determined from an input frame of image data. Elements of the color filter array corresponding to first and second rectangular lattices of the color filter array are selected. Second and third color components corresponding to elements of the first and second rectangular lattices are determined from the sample values in an input frame of image data.

20 Claims, 11 Drawing Sheets

FIG. 1

(Prior Art)

FIG. 2

(Prior Art)

COLOR FILTER ARRAY ALIGNMENT DETECTION

FIELD OF THE INVENTION

An embodiment of the present invention generally relates to image sensors and color filter arrays.

BACKGROUND

Digital imaging systems capture image data using light sensitive sensors. Most image sensors utilize arrays of charge coupled devices (CCDs) or complementary metal-oxide-semiconductor (CMOS) active pixel sensors. CCD and CMOS active pixel sensors are monochrome in that they measure light intensity but do not differentiate between different wavelengths of different colored light. To measure the intensity of light corresponding to a particular color, a filter is placed in front of the sensor to isolate wavelengths of light corresponding to a specific color.

An image is captured by detecting amounts of light corresponding to different color components. In most implementations, the image sensor array is overlaid with a color filter array (CFA) including multiple color filters arranged in a pattern. Light of different frequencies is allowed to pass through the CFA at different locations, such that each sensor in the array samples the intensity of light of only one color component. The data captured from each sensor pixel contains information about only one color, depending on which color filter is positioned over that particular sensor. However, to generate a complete color image, the intensities of three primary color components are required for each pixel.

To determine pixel data of a color image from a CFA sub-sampled image, the intensity of light of missing color components must be interpolated for each pixel from neighboring pixels in the sensor array. This process is commonly referred to as demosaicking.

CCD and CMOS Image sensors provide a sequence of pixels to downstream image processing stages. Raw CFA data is read out of the image sensor array row by row. In order for the CFA interpolation algorithm to work properly, orientation or alignment of the CFA needs to be known so that the algorithm knows which sensors are detecting which color components. The orientation of the CFA is otherwise known as the phase or alignment and such terms are used interchangeably herein.

During placement of a CFA on a sensor array, care normally must be taken to ensure proper alignment. Misalignment may occur as the result of the CFA being shifted to an incorrect phase. Misalignment may result from a shift by a row and/or column of the CFA on the image sensor. Misalignment, if not compensated for, results in severe color distortion of a captured image. Due to multiple possible phase alignments, current CFA interpolation hardware requires the phase of the CFA as an input. The phase may be required to be calculated every time either the sensor changes, or different cropping parameters are programmed into the first active horizontal column, or first active vertical column registers of the sensor.

One or more embodiments of the present invention may address one or more of the above issues.

SUMMARY

In one embodiment of the present invention, a method for determining a phase alignment of a Bayer color filter array is provided. A quincunx lattice of the color filter array that corresponds to a first color component is determined from sample values in an input frame of image data. Elements of the color filter array corresponding to first and second rectangular lattices of the color filter array are selected. The first and second rectangular lattices are mutually exclusive from each other and from the quincunx lattice of the color filter array. Second and third color components corresponding to elements of the first and second rectangular lattices are determined from the sample values in an input frame of image data.

In another embodiment, a method for determining a phase alignment of a color filter array is provided. A plurality of mutually exclusive sets of elements of the color filter array are determined. Each set includes elements corresponding to a color component of the color filter array. An image data frame is interpolated to produce pixel data. Two or more permutations of the color components of the color filter array mapped to the mutually exclusive sets of elements are generated. For each permutation, pixel data is transformed to a color space encoding and a reference component is selected from the color components of the color filter array. A mask is generated for the reference component. The mask is applied to each color component of the color space encoding. A distribution pattern of each masked color component is determined. The permutation having distribution patterns closest to an expected distribution pattern is selected.

In yet another embodiment of the present invention, an article of manufacture is provided. The article is characterized by a processor-readable storage medium configured with processor-executable instructions, the instructions when executed by a processor cause a processor to determine a quincunx lattice of the color filter array that corresponds to a first color component from sample values in an input frame of image data. The instructions further cause the processor to select elements of the color filter array corresponding to first and second rectangular lattices of the color filter array. The first and second rectangular lattices are mutually exclusive from each other and from the quincunx lattice of the color filter array. The instructions further cause the processor to determine second and third color components corresponding to elements of the first and second rectangular lattices from the sample values in an input frame of image data.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

In digital imaging systems, an image sensor array is overlaid with a color filter array (CFA) including a plurality of color filters arranged in a pattern. The data captured for each sensor pixel only contains information about one color, depending on which color filter is positioned over that particular sensor. To generate a complete color image, the light intensity of missing color components are interpolated from nearby pixels sensors detecting the missing color components. Due to multiple possible phase alignments and multiple possible color filter array patterns, the alignment of the CFA on the sensor array must be determined in order to know which sensors correspond to each color component before interpolation can be performed. The phase alignment may be required to be calculated every time either the sensor changes, or different cropping parameters are programmed into the first active horizontal column, or first active vertical column registers of the sensor.

One or more embodiments of the present invention provide a method and system for identification of a phase alignment of a color filter array. The various methods of detection disclosed herein can be employed after manufacturing has been completed and used to configure the processing of images captured by an image sensor overlaid with a color filter array.

Figure 1:
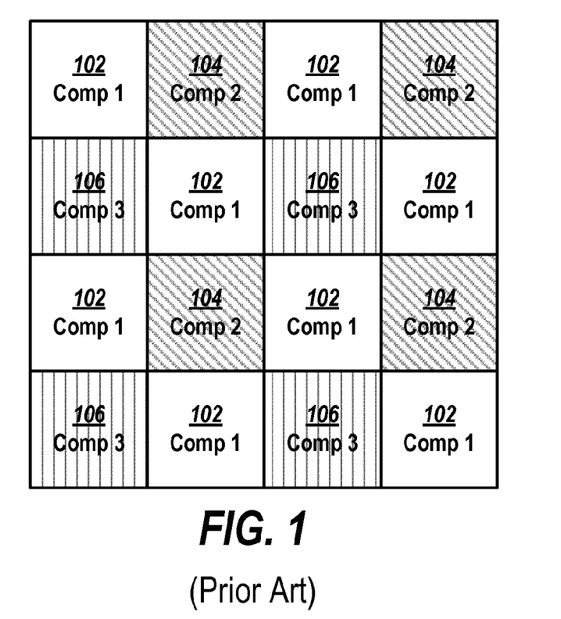
FIG. 1 shows an example 3-component Bayer color filter array.

One or more embodiments of the present invention may be used in conjunction with a number of different color filter arrays having color components arranged in various patterns. The most commonly used color filter array, shown in FIG. 1, is known a Bayer filter. A Bayer filter contains color filters corresponding to three additive primary colors: comp1 (102), comp2 (104), and comp3 (106). Filters passing a first color component 102 are arranged in a quincunx lattice. Filters of the array for the second 104 and third color 106 components are arranged in respective rectangular lattices. The three color components correspond to an additive set of primary colors. Generally, the primary color components used are red, green, and blue (RGB) or cyan, yellow, and magenta (CYM) depending on the implementation.

Figure 2:
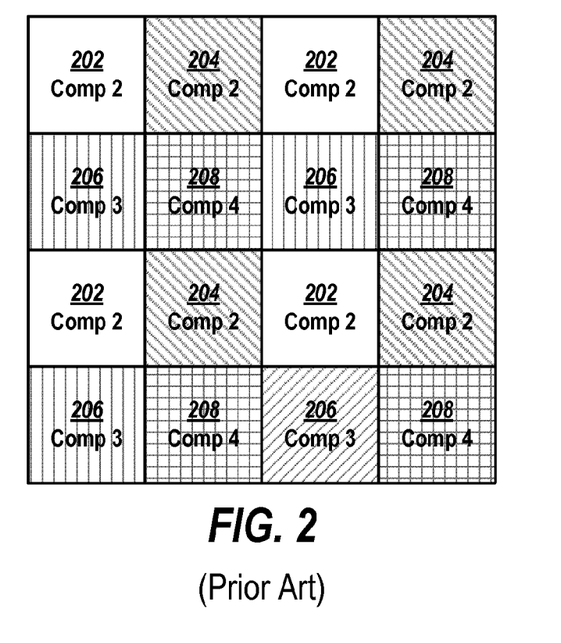
FIG. 2 shows an example 4-component Bayer color filter array.

Other color filter arrays may include four color components such as: red/green/blue/white (RGBW); cyan/yellow/magenta/white (CYMW); cyan/yellow/green/magenta (CYGM); etc. FIG. 2 shows an example four-color component color filter array. In this example, filters for each color component are arranged in respective rectangular lattice patterns. This pattern arrangement is sometime referred to as a 4-component Bayer filter. For simplicity, one or more embodiments of the invention are described primarily with reference to use in an RGB Bayer filter. However, the embodiments of the invention are not so limited and are understood to be applicable to phase alignment identification for a number of different color filter arrays known in the art.

In an RGB Bayer filter, the green color component is detected by pixels of the quincunx lattice 102 and red and blue color components are detected by pixels of the rectangular lattices 104 and 106 as shown in FIG. 1. The green color component filters are arranged in a quincunx pattern to ensure that more sensor locations are dedicated to green than to the other primary colors. The reason for the preference for green is that images in nature have more content in the green area of the spectrum. The human visual system is also more sensitive in similar spectral areas.

Figure 3:
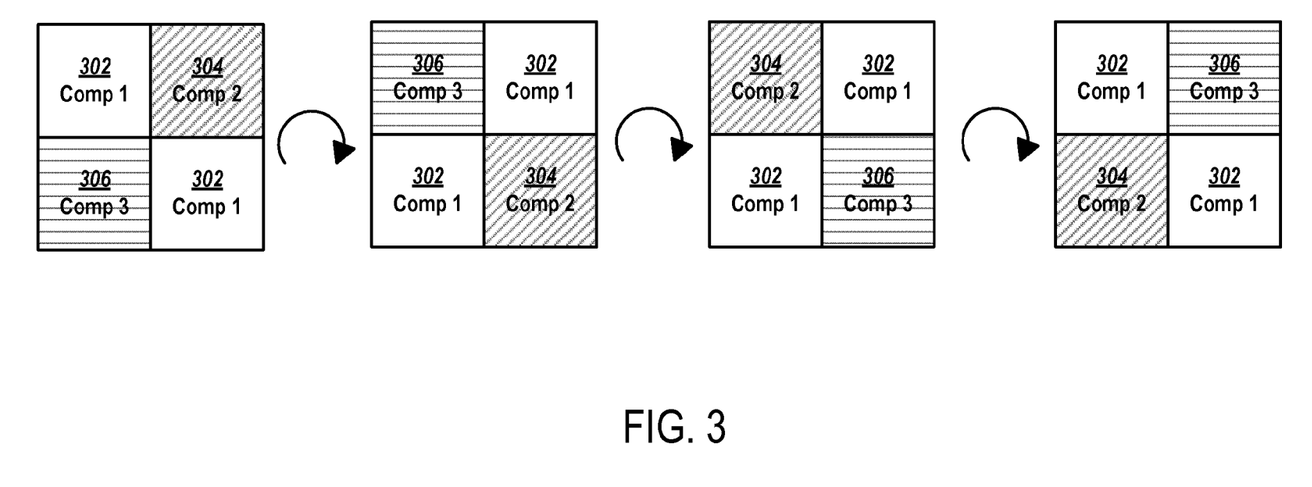
FIG. 3 illustrates the different phase alignments of the color filter array shown in FIG. 1.

Images are scanned in raster format from sensors, typically one row or column at a time. Regardless of where this scanning begins, four possible color arrangements or phases can be identified. FIG. 3 illustrates the four possible phase alignments of a Bayer filter with first 302, second 304, and third 306 color components. The relative phase of the Bayer filter may be identified by the color component of the leftmost two pixels of the first (topmost) row. Due to the regularity of the Bayer pattern, two bits are both necessary and sufficient to describe the relative phase of the Bayer sampling grid. One bit can identify whether the first row contains red or blue samples, and the other bit identifies whether the very first pixel of a frame is green or not. Typically, image sensor manufacturers specify a CFA phase alignment by a diagram, such as the one illustrated in FIG. 3. One or more embodiments of the present invention eliminate the need for the manufacturer to specify the phase alignment. The phase alignment is automatically determined based on analysis of a sample image.

The various implementations disclosed herein utilize spatial or spectral analysis of sensor data to determine color components corresponding to sensor elements. In some implementations, a two-step process is employed: first, spatial analysis is used to determine sensor elements corresponding to each quincunx lattice pattern of the color filter array; and second, spectral analysis is employed to determine color components corresponding to each of the rectangular lattices. In the discussion of the various implementations, spatial correlation refers to the tendency of pixels to assume similar color values within a localized region of the sensor array. Spectral correlation refers to the dependency between the values of different color components in a localized region.

The spatial correlation between sensor elements of the same color in a local region is usually much stronger than cross-correlation between sensors corresponding to different color channels. In one embodiment of the invention, the alignment of the quincunx lattice is identified by analyzing an auto-correlation between pixels. If the pixel elements of the Bayer filter are separated into quincunx lattices, one quincunx lattice will contain all green elements and the second quincunx lattice will contain a mix of blue and red color components. Therefore, an auto-correlation computed on a quincunx grid, flush with the green pixels, will be higher than the same auto-correlation pattern computed on a quincunx lattice having a mix of red and blue pixels. The auto-correlation can be determined from a sum of absolute differences for each of the quincunx lattices. In this manner, the orientation of the quincunx lattice with sensor elements corresponding to the green color can be identified.

Figure 4:
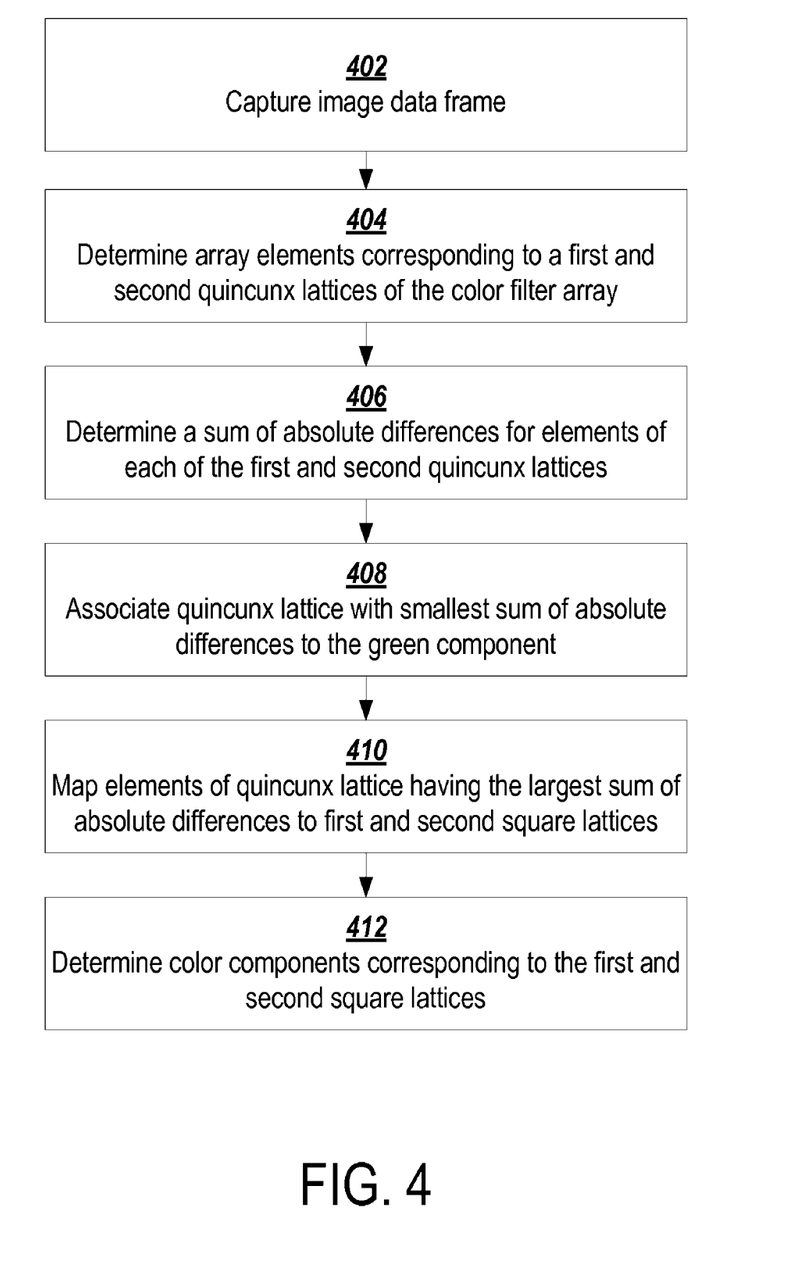
FIG. 4 shows a flowchart of a process to determine color filter array elements corresponding to the quincunx lattice and first and second rectangular lattices of a Bayer color filter array.

FIG. 4 shows a flowchart of a process to determine color filter array elements corresponding to the quincunx lattice and color filter array elements corresponding to first and second rectangular lattices of a Bayer color filter array. A frame of raw sensor data is captured at step 402. Sensor elements of the sensor array are selected according to first and second quincunx lattices of the color filter array at step 404. One of the first and second quincunx lattices will contain only green filters and the other quincunx lattice will contain a mix of red and blue filters. The two different quincunx lattices may be seen in FIG. 1.

A sum of absolute differences is determined for data captured by sensor elements of each of the first and second quincunx lattices at step 406. The sum of absolute differences is determined by grouping values from sensor elements corresponding to the first quincunx lattice into pairs, and determining the absolute value of the difference between each pair of values such that:

$$SAD(j) = \Sigma |Sensor_i - Sensor_{i,j}|$$

The absolute differences of each pair of sensor elements are summed to determine the sum or absolute differences for the quincunx lattice.

Elements of the quincunx lattice corresponding to the sensor elements having the smallest sum of absolute differences are associated with the green color component at step 408. Elements of the quincunx lattice corresponding to the sensor elements having the largest sum of absolute differences are concluded to include the red and blue sensor elements. The quincunx lattice having red and blue sensor elements is separated and mapped to first and second square lattices at step 410. Each square lattice includes elements from alternating rows of the quincunx lattice. For example, the first and second square lattices may include elements from respective odd and even numbered rows of the quincunx lattice having the largest sum of absolute differences. Further analysis is performed to determine which of the first and second square lattices corresponds to the red and blue color components at step 412.

The process shown in FIG. 4 may also be applied to the four-color Bayer filter shown in FIG. 2. For example, when an RGBW Bayer filter is divided and mapped to first and second quincunx lattices, one quincunx lattice will contain white and green elements, and the second quincunx lattice will contain blue and red color components. Because white elements are essentially unfiltered, and because the green color component is more prevalent in natural images, the quincunx lattice with white and green filtered sensors will have a higher correlation than the quincunx lattice including red and blue filtered sensors. The light detected by white pixel sensors includes red, blue, and green wavelengths and, thus, will also have a higher intensity than green filtered sensor elements. In this manner, green and white sensor elements can be identified.

To perform identification, the quincunx lattice with the lower sum of absolute differences is separated into rectangular lattices. The measured light intensity is summed for each rectangular lattice. Of the rectangular lattices, elements of the lattice with the highest sum are associated with the white component, and elements of the lattice with the lowest sum are associated with the green component.

In another embodiment of the invention, spatial correlation analysis is performed for one or more phase arrangements to determine sensor elements corresponding to the quincunx and rectangular lattices of the Bayer filter.

Figure 5:
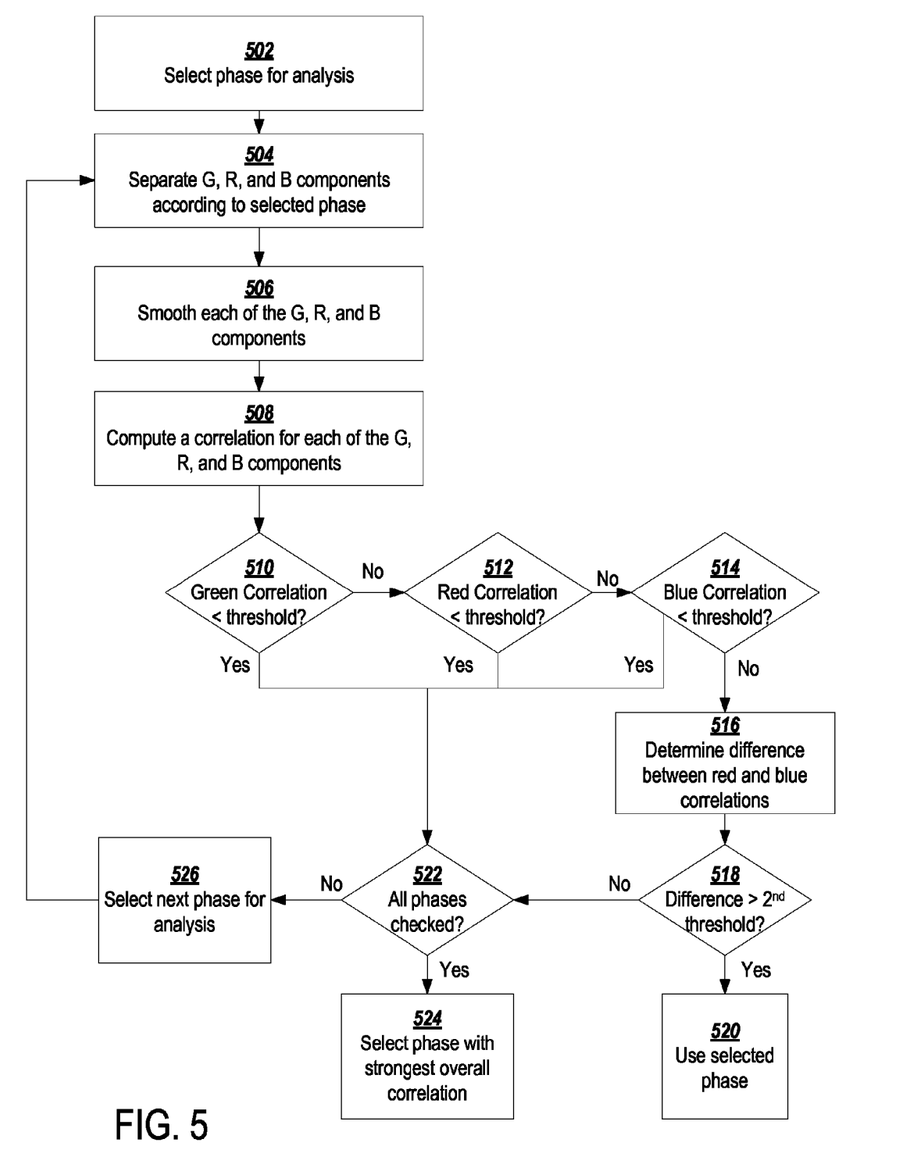
FIG. 5 shows a flowchart of a process to determine color filter array elements corresponding to the quincunx lattice and first and second rectangular lattices of a Bayer color filter array.

FIG. 5 shows a flowchart of a process to determine color filter array elements corresponding to the quincunx lattice and first and second rectangular lattices of a Bayer color filter array using spatial correlation analysis. As discussed above, the quincunx arrangement of the green component should produce strong correlation among the same color samples. Since there are more green samples, due to the nature of color images, it follows that the local spatial correlation ought to be strong among nearby sensor locations of the same color filter array.

A phase is selected at step 502. Elements of the sensor array are mapped to color components according to the selected phase at step 504. Each color component is then smoothed at step 506. It is expected that each color component is smoothed so that high frequency components (e.g. missing color components interpolated from the quincunx lattice) are deemphasized. The smoothing operation can be performed using an Gaussian or FIR two-dimensional low pass filter One particular example of a two-dimensional Gaussian function is:

$$f(x, y) = Ae^{-\left(\frac{(x-x_0)^2}{2\sigma_x^2} + \frac{(y-y_0)^2}{2\sigma_y^2}\right)}.$$

When using a Gaussian filter for smoothing, a preferred embodiment implements the ISO 11562 Gaussian Profile filter specified by the International Standards Organization (ISO).

One example two-dimensional FIR filter is represented by the summation:

$$y_{u,v} = \sum_{i=0}^{N} \sum_{j=0}^{M} a_{i,j} x_{u+i, v+j}$$

where $y_{u,v}$ is a pixel of the smoothed output image, $x_{u,v}$ is pixel of the input image, N and M are the dimensions of a rectangular filter kernel, and $a_{i,j}$ are the filter coefficients. Through the selection of filter coefficients, the filter strength, transfer function, cutoff frequency as well as the kernel shape can be modified arbitrarily. In a preferred embodiment, when using a non-Gaussian approach, the filter coefficients have the values [−1, 0, 9, 16, 9, 0, −1]/32 in horizontal and vertical dimensions. In this manner, smoothing prevents the correlation function from being influenced by edges and other high frequency features.

A spatial correlation, such as the sum of absolute differences detailed above, is computed for each color component of the selected phase at step 508. The computed correlation values are compared to one or more selected threshold values at steps 510, 512, and 514. If the calculated correlation value of each color component is greater than the respective threshold, a difference between the correlation value of the red and blue color components is determined at step 516. If the rectangular lattices of the selected phase do not correspond to the green quincunx lattice of the Bayer filter, the calculated correlation values of the red and blue color components would be expected to be the same. If the difference is greater than a second threshold value at step 518, the phase selected at step 402 is used. If the difference is less than a second threshold value at step 518 or one of the color components has a correlation value below the selected threshold at steps 510, 512, or 514, another phase alignment is selected at step 526 and analyzed. The process repeats until a phase is found or all phases are analyzed 522. If a determinative phase alignment is not found, the phase alignment having the strongest overall correlation, determined by summing the correlation of all color components for each phase, is selected for use at step 524.

It is noted that red and blue color components exhibit a strong spatial correlation when both are aligned with one of the rectangular lattices. This is true even if red and blue color components are reversed. In one or more embodiments of the present invention, spectral analysis is performed in order to assign red and blue color components to the correct rectangular lattice.

Following identification of the green color component sensor elements in the RGB implementation, or green and white color components in the four-color Bayer filter implementation, further analysis is required to differentiate between red and blue sensor elements. In some embodiments of the invention, red and blue components can be distinguished by analyzing the spectral distribution of pixel data in a color space.

One of the most commonly used color spaces is the 1931 International Commission on Illumination (CIE) color space. The CIE color space uses color coordinates x, y, and z, where $x+y+z=1$. To convert to CIE color space, red, green, and blue color components are first normalized, such, that:

$$x = \frac{R}{R+G+B}, \text{ and } y = \frac{G}{R+G+B}$$

Figure 6:
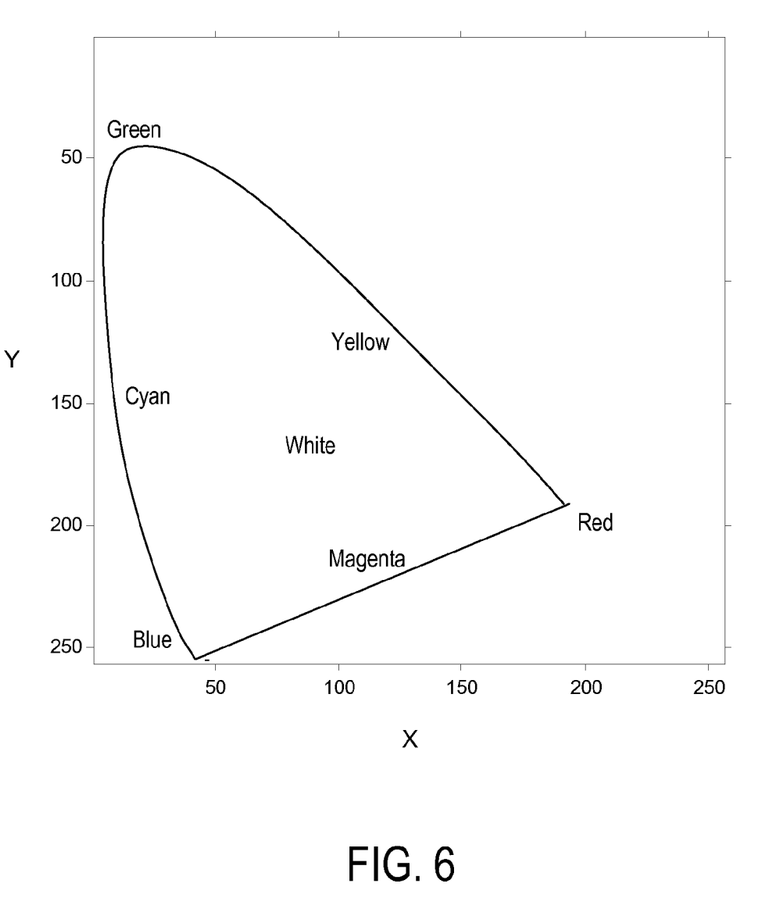
FIG. 6 shows a diagram of the CIE color space.
Figure 7:
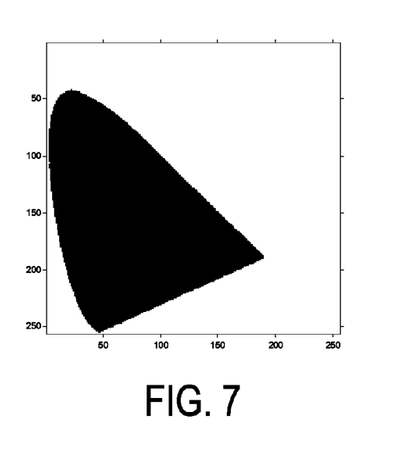
FIGS. 7 and 8 show respective diagrams of CIE color space gamuts with red and blue color components uninverted and inverted.

FIG. 6 shows a diagram of the CIE color gamut defined by the x, y coordinates defined above. Assuming illumination of a natural scene projected onto the image sensor originates from a light source with a Gaussian spectral power distribution, most colors measured by a pixel of the sensor array will fall within the CIE color gamut. If red and blue color component data is measured from the correct sensors in the sensor array, the pixel data interpolated and converted to the CIE color space should fall within the mask area shown in FIG. 7. This area can be transformed to delineate where a majority of pixel values will fall if red and blue color components are swapped such that:

$$x = \frac{B}{R+G+B}$$

Figure 8:
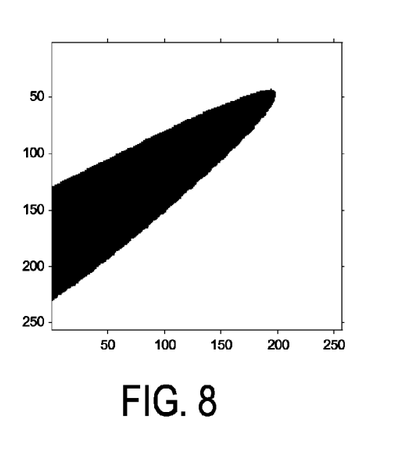

If red and blue components are swapped, the image data interpolated and converted to the CIE color space should fall within the mask area shown in FIG. 8.

Figure 9:
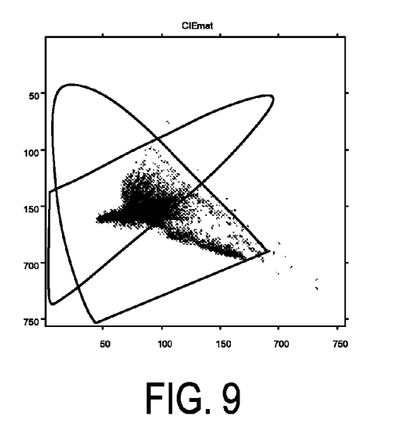
FIG. 9 shows an example distribution of an image in CIE color space with color red and blue components correctly assigned.
Figure 10:
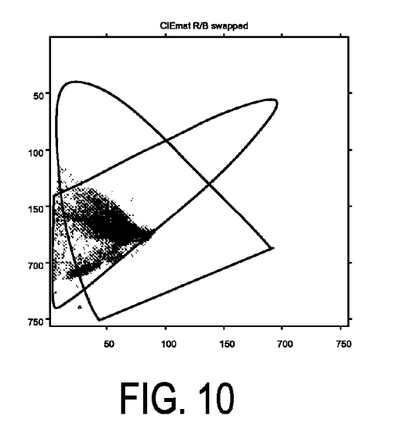
FIG. 10 shows an example distribution of an image in CIE color space with red and blue color components inverted.

In one embodiment of the invention, an image data frame is converted to the CIE color space and masked with each of the masks shown in FIGS. 7 and 8 to determine which gamut has stronger spectral correlation to the image data frame. FIG. 9 shows an example image data frame having correct red and blue alignment in CIE color space since almost all of the pixel data points fall within the masked area shown in FIG. 7. FIG. 10 shows an example image data frame having interchanged red and blue color components since many of the pixel data points fall outside of the masked area defined in FIG. 7 and almost all of those pixel data points fall within the masked area shown in FIG. 8. The correlation for each mask can be determined by masking the image data and summing the number of pixels falling within each color gamut.

Figure 11:
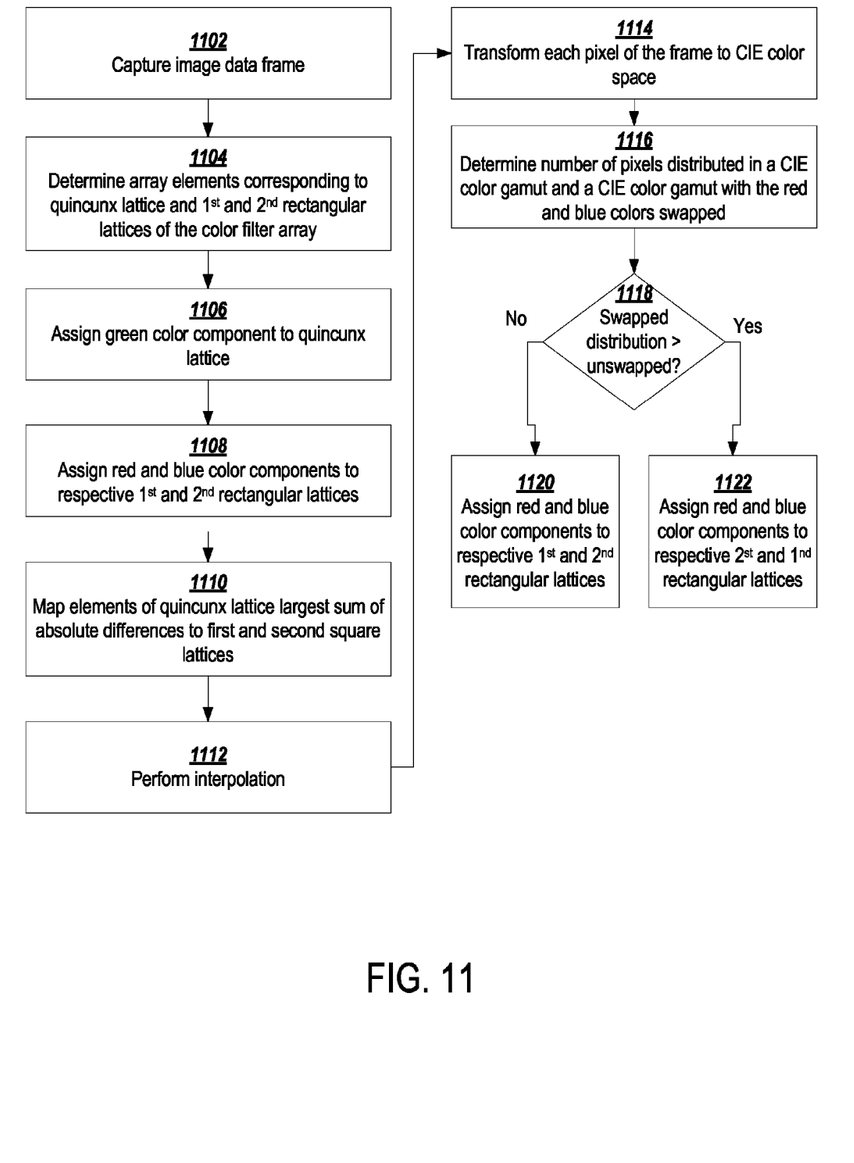
FIG. 11 shows a flowchart of a process to determine color components corresponding to each rectangular lattice of a Bayer color filter array.

FIG. 11 shows a flowchart of a process for determining sensor array elements corresponding to red and blue color components using spectral analysis in accordance with one or more embodiments of the present invention. An image data frame is captured at step 1102.

Elements corresponding to the quincunx lattice and first and second rectangular lattices of the color filter array are determined at step 1104. The methods described in FIG. 3 or 4 may be used to determine sensor elements corresponding to each lattice. The green color component is assigned to the quincunx lattice at step 1106. Red and blue color components are assigned to the determined square lattices at step 1108. Interpolation is performed on the image data frame at step 1110 and the interpolated image is converted to CIE color space at step 1112. In VLSI/FPGA applications a relatively small table can be used by quantizing CIE x, y values to 5 bits. The numbers of pixels distributed within each of the CIE color gamut and the "swapped" CIE color gamut (having the red and blue colors swapped) are determined at step 1116. If the number of pixels in the swapped color gamut is less than the number of pixels in the unswapped color gamut at decision step 1118, the red and blue color components remain assigned to current rectangular lattices at step 1120. Otherwise, red and blue color components are swapped and assigned to the opposite rectangular lattices at step 1122.

In some embodiments, the process may be repeated over several image data frames, accumulating the number of pixels in each color gamut after each frame. Each image data frame is converted to CIE color space, and x, y coordinate pairs are accumulated and placed in the color space histogram shown in FIG. 6. The resulting color frequency histogram is masked with the masks shown in FIGS. 7 and 8 to yield a respective number of data points, $S_{normal}$ and $S_{inverted}$, falling within each color gamut. An accumulated value R(n) is calculated by the equation:

$$R(n) = \{R(n-1) + (S_{normal} - S_{inverted})\}/r,$$

where r sets a tradeoff between how fast the system reacts to a swap in color channels versus noise immunity. A negative accumulated value of R(n) indicates red and blue color components are swapped and need to be reversed.

In another embodiment of the invention, the distribution of each color component is analyzed to determine the phase alignment of the color filter array. An image is captured by an image sensor, interpolated, and converted to a color space, such as CIE, according to an assumed phase alignment of the color filter array on the image sensor. A natural image frame is expected to have a spatial and spectral distribution where 60% of the content comes from green, 30% from red, and 10% from blue. A mask can be created to isolate areas of the image containing each of the color components. The distribution of color content in an image frame can be determined by summing the sensor element values of the color components' values after isolation. By comparing the distribution of each color component to the expected distribution, an assumed phase can be tested and verified.

It is noted that some images captured by a user will not have the expected natural distribution. For example, an image of the sky may have a larger distribution of the blue color component. In some embodiments of the invention, this process is repeated over several image frames to detect an average detected distribution.

In some embodiments, a test pattern is used to capture a test pattern image with a known distribution. In these embodiments, only one image frame is necessary to determine the correct phase alignment of the color filter array. The test pattern can be easily generated and captured from any monitor or display. Although the precise hues may not be the same across all display monitors, the relative colors in a specific display are consistent. Therefore measurements can be reliably taken by pointing the sensor to the display to capture an image of the test pattern. The test pattern image may also be captured from a printed copy of the test pattern. Like the analysis performed in the natural image implementation, the captured image is interpolated and converted to a color space according to an assumed phase alignment. A mask is created to isolate areas of the image containing each of the color components and determine the distribution of each color component. The assumed phase can be verified by determining whether each color component is distributed in expected areas of the test pattern.

Figure 12:
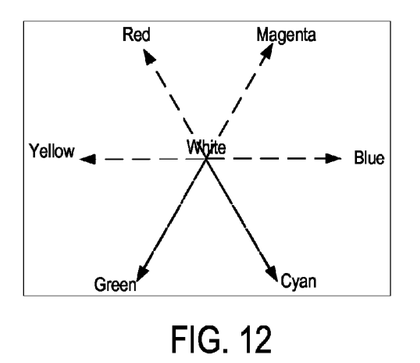
FIG. 12 shows a diagram of a color wheel pattern that may be used to identify the phases of a color filter array in accordance with an embodiment of the invention.

A number of different color test patterns may be used in accordance with the processes disclosed herein. FIG. 12 shows one example color test pattern that may be used to determine the phase alignment of a color filter array. The color test pattern sweeps across colors using fixed luminance and various x, y saturation values—creating all hues from 0 to 360 degrees. In this example color test pattern, the primary colors red, green, and blue are located approximately at respective 120, 240, and 360 angles.

Figure 13:
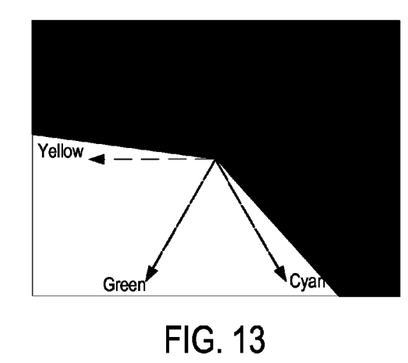
FIG. 13 shows the color wheel pattern of FIG. 12 with a mask corresponding to the green color component applied.
Figure 14:
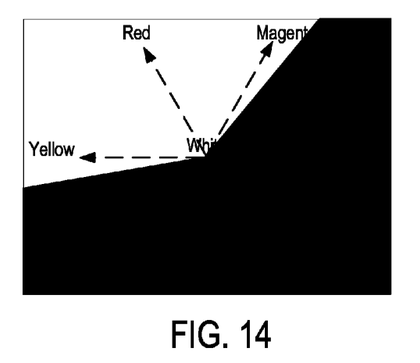
FIG. 14 shows the color wheel pattern of FIG. 12 with a mask corresponding to the red color component applied.
Figure 15:
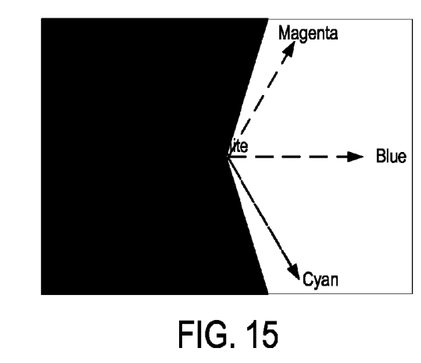
FIG. 15 shows the color wheel pattern of FIG. 12 with a mask corresponding to the blue color component applied.

FIGS. 13, 14, and 15 show the test pattern of FIG. 12 masked with respective green, red, and blue color component masks. The process of creating the mask involves detecting the relationship between the reference color component to the other color components and determining the similarity using a threshold. Typically, in an 8-bit image, the threshold corresponds to the lower 4 significant bits (range 8 to 16). If all the color differences with respect to a reference color are small, a mask of the reference color can be extracted.

Figure 16:
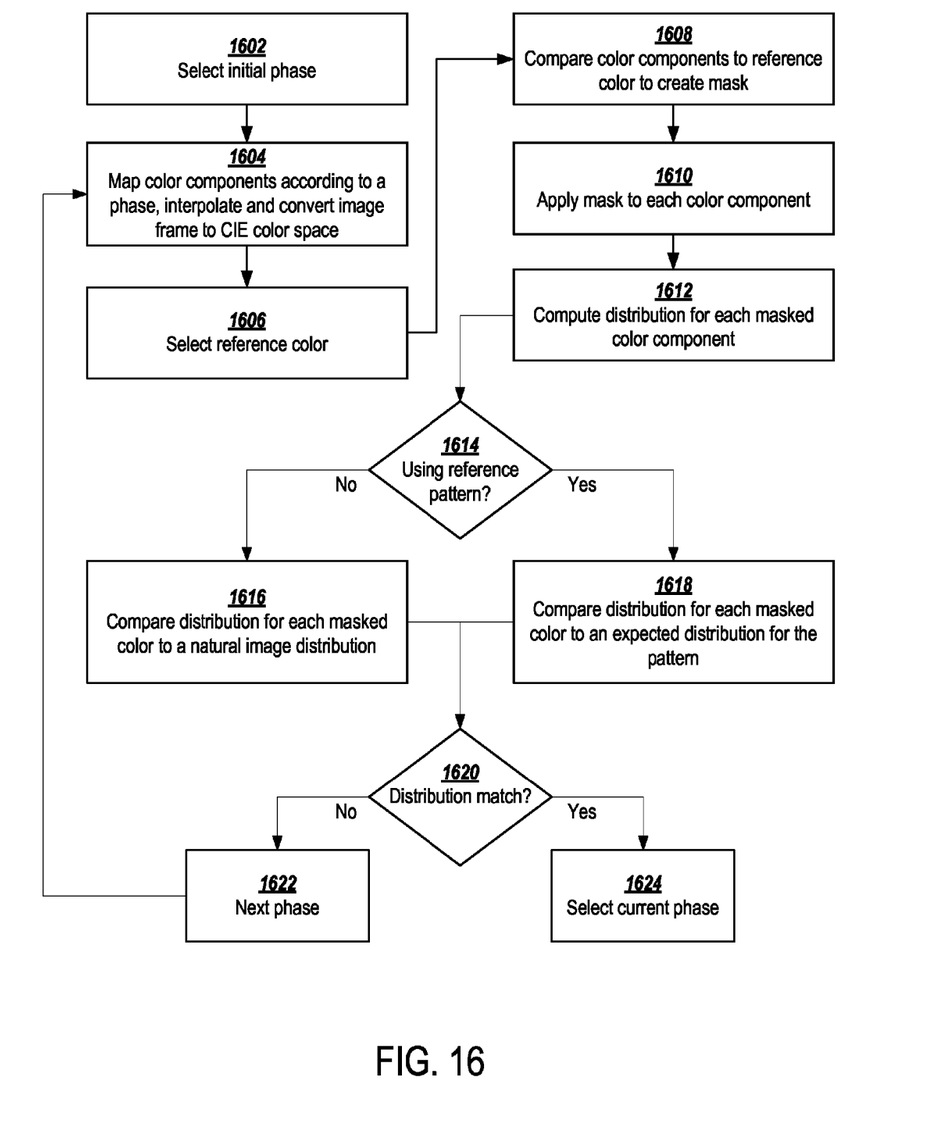
FIG. 16 shows a flowchart of a process to determine the phase of a color filter array using spectral analysis in accordance with an embodiment of the invention.

FIG. 16 shows a flowchart of a process for determining phase alignment of a color filter array using spectral distribution analysis of individual color components in accordance with one or more embodiments of the invention. An initial phase is selected at step 1602. Color components are mapped to sensor elements according to the selected phase at step 1604. An image data frame is interpolated and converted to CIE color space with the mapping. A reference color is selected at step 1606.

Color components of the converted image are compared at step 1608 to create a mask for the reference color. The mask is created by determining a difference between the reference color and each of the color components for each pixel. The differences are compared to a selected threshold value. If any of the differences exceeds the selected threshold, the pixel is masked. Each color component of the converted image is masked with the mask created in step 1608 and a distribution of each masked color component is computed at step 1612.

The distributions are compared to distribution signatures. Various distribution signatures can be used for comparison depending on image captured in the image frame for a particular implementation. For example, if a reference pattern is used for image capture, decision step 1614 directs the process to step 1618 where the distribution of each masked color component is compared to an expected distribution for the reference pattern. Alternatively, if a natural image is used for image capture, decision step 1614 directs the process to step 1616 where the distribution of the masked color component is compared to an expected distribution of a natural image. For example, RGB images have an expected distribution in CIE color space of 0.6 for the green component, 0.3 for the red component, and 0.1 for the blue component. If distributions match the expected distribution at decision step 1620, the current phase is selected at step 1624. Otherwise, the next phase is selected at step 1622 and the process is repeated.

From an implementation perspective, the process may be employed in a manufacturing setting or may be incorporated into a digital imaging device. The phase alignment detection may be performed dynamically by integrated circuitry, such as an FPGA, which in turn adjusts its internal configuration to correctly process the particular sampling pattern.

Figure 17:
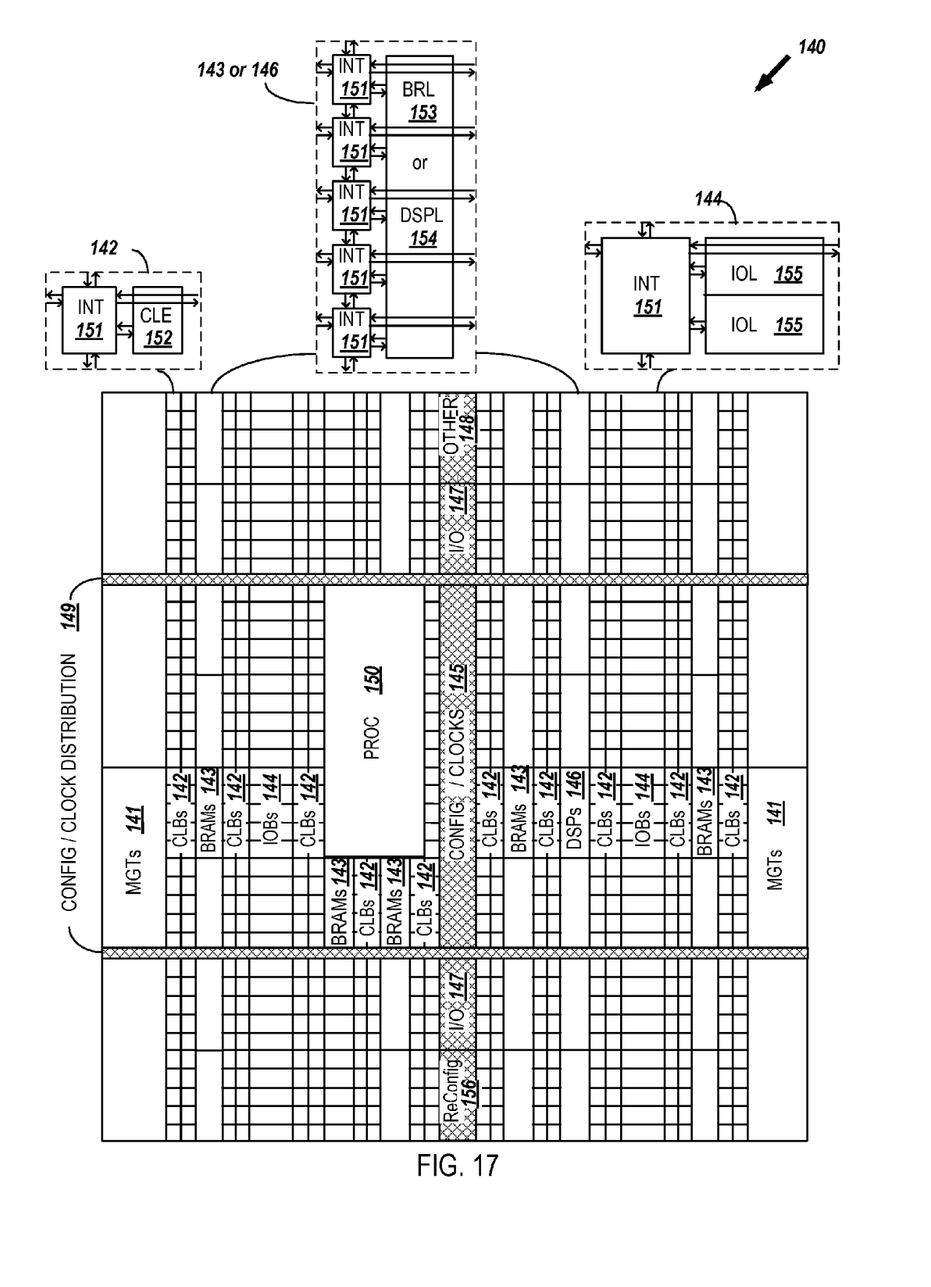
FIG. 17 shows a programmable logic integrated circuit that may be configured to implement the processes of one or more embodiments of the present invention.

FIG. 17 is a block diagram of an example programmable integrated circuit that may be used in implementing phase alignment detection in accordance with one or more embodiments of the invention. The processes previously described may be implemented on the programmable logic and interconnect resources of programmable integrated circuit, such as an FPGA.

FPGAs can include several different types of programmable logic blocks in the array. For example, FIG. 17 illustrates an FPGA architecture (140) that includes a large number of different programmable tiles including multi-gigabit transceivers (MGTs) 141), configurable logic blocks (CLBs) 142, random access memory blocks (BRAMs) 143, input/output blocks (IOBs) 144, configuration and clocking logic (CONFIG/CLOCKS) 145, digital signal processing blocks (DSPs) 146, a reconfiguration port (RECONFIG) 156, specialized input/output blocks (I/O) 147, for example, e.g., clock ports, and other programmable logic 148 such as digital clock managers, analog-to-digital converters, system monitoring logic, and so forth. Some FPGAs also include dedicated processor blocks (PROC) 150.

In some FPGAs, each programmable tile includes a programmable interconnect element (INT) 151 having standardized connections to and from a corresponding interconnect element in each adjacent tile. Therefore, the programmable interconnect elements taken together implement the programmable interconnect structure for the illustrated FPGA. The programmable interconnect element INT 151 also includes the connections to and from the programmable logic element within the same tile, as shown by the examples included at the top of FIG. 17.

For example, a CLB 142 can include a configurable logic element CLE 152 that can be programmed to implement user logic plus a single programmable interconnect element INT 151. A BRAM 143 can include a BRAM logic element (BRL) 153 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 146 can include a DSP logic element (DSPL) 154 in addition to an appropriate number of programmable interconnect elements. An IOB 144 can include, for example, two instances of an input/output logic element (IOL) 155 in addition to one instance of the programmable interconnect element INT 151. As will be clear to those of skill in the art, the actual I/O pads connected, for example, to the I/O logic element 155 are manufactured using metal layered above the various illustrated logic blocks, and typically are not confined to the area of the input/output logic element 155.

In the pictured embodiment, a columnar area near the center of the die (shown shaded in FIG. 17) is used for configuration, clock, and other control logic. Horizontal areas 149 extending from this column are used to distribute the clocks and configuration signals across the breadth of the FPGA.

Some FPGAs utilizing the architecture illustrated in FIG. 17 include additional logic blocks that disrupt the regular columnar structure making up a large part of the FPGA. The additional logic blocks can be programmable blocks and/or dedicated logic. For example, the processor block PROC 150 shown in FIG. 17 spans several columns of CLBs and BRAMs.

Note that FIG. 17 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 17 are purely exemplary. For example, in an actual FPGA more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures of one or more embodiments of the present invention.

Figure 18:
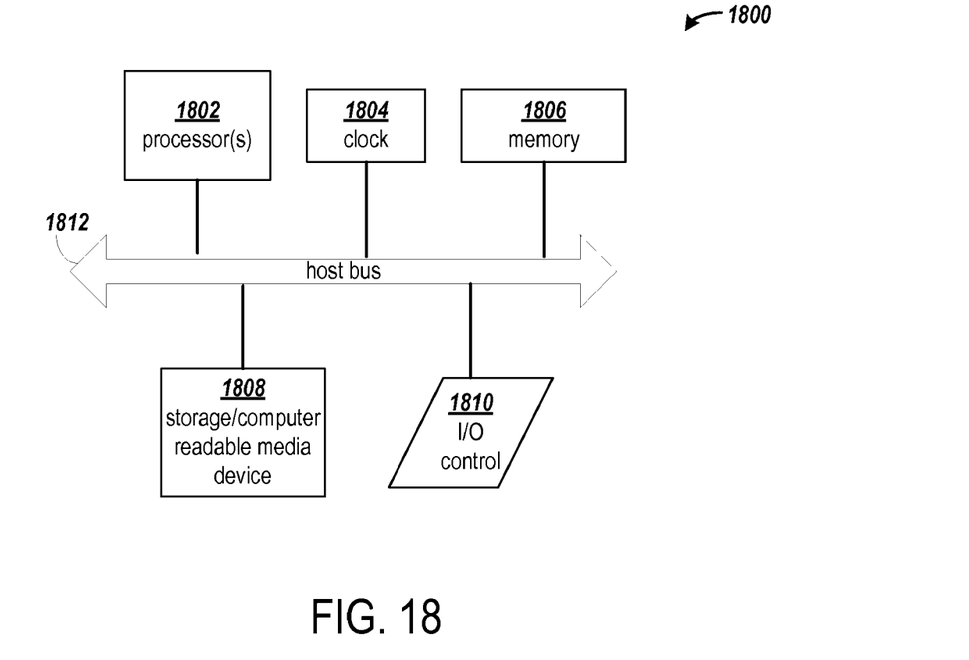
FIG. 18 illustrates a block diagram of a general-purpose processor computing arrangement for implementing the processes of one or more embodiments of the present invention.

FIG. 18 is a block diagram of an example computing arrangement on which the processes described herein may be implemented using a processor. Those skilled in the art will appreciate that various alternative computing arrangements, including one or more processors and a memory arrangement configured with program code, would be suitable for hosting the processes and data structures and implementing the algorithms of one or more embodiments of the present invention. The computer code, comprising the processes of one or more embodiments of the present invention encoded in a processor executable format, may be stored and provided via a variety of computer-readable storage media or delivery channels such as magnetic or optical disks or tapes, electronic storage devices, or as application services over a network.

Processor computing arrangement 1800 includes one or more processors 1802, a clock signal generator 1804, a memory unit 1806, a storage unit 1808, and an input/output control unit 1810 coupled to host bus 1812. The arrangement 1800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 1802 may be one or more general purpose processors, or a combination of one or more general purpose processors and suitable co-processors, or one or more specialized processors (e.g., RISC, CISC, pipelined, etc.).

The memory arrangement 1806 typically includes multiple levels of cache memory, a main memory. The storage arrangement 1808 may include local and/or remote persistent storage such as provided by magnetic disks (not shown), flash, EPROM, or other non-volatile data storage. The storage unit may be read or read/write capable. Further, the memory 1806 and storage 1808 may be combined in a single arrangement.

The processor arrangement 1802 executes the software in storage 1808 and/or memory 1806 arrangements, reads data from and stores data to the storage 1808 and/or memory 1806 arrangements, and communicates with external devices through the input/output control arrangement 1810. These functions are synchronized by the clock signal generator 1804. The resource of the computing arrangement may be managed by either an operating system (not shown), or a hardware control unit (not shown).

One or more embodiments of the present invention is thought to be applicable to a variety of systems for phase alignment detection. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for determining a phase alignment of a Bayer color filter array, the method comprising:
    using a processor, determining, from sample values in an input frame of image data, sensor elements of a sensor array that correspond to a first color component in a quincunx lattice of the color filter array;
    selecting elements of the color filter array corresponding to first and second rectangular lattices of the color filter array, wherein the first and second rectangular lattices are mutually exclusive from each other and from the quincunx lattice of the color filter array; and
    determining sensor elements of the sensor array that correspond to second and third color components of the first and second rectangular lattices from the sample values in the input frame of image data.

2. The method of claim 1, wherein the determining the quincunx lattice of the color filter array that corresponds to the first color component includes:
    determining respective sums of absolute differences of sample values in alternative quincunx lattices of the image data; and
    wherein the quincunx lattice of the color filter array corresponding to the first color component is one of the alternative quincunx lattices having a smallest of the respective sums of absolute differences.

3. The method of claim 1, wherein the determining the quincunx lattice of the color filter array that corresponds to the first color component includes:
    selecting a first set of elements of the color filter array arranged in a first quincunx lattice pattern corresponding to a first phase alignment of the color filter array;
    selecting second and third sets of elements of the color filter array arranged in rectangular lattice patterns corresponding to the first phase alignment of the color filter array;
    determining respective correlation values for each of the first, second, and third sets of elements;
    determining a difference between the correlation values of the second and third sets of elements; and
    in response to each of the correlation values being greater than a first selected threshold and the difference between the correlation value being greater than a second selected threshold, associating the first set of elements with the quincunx lattice of the color filter array.

4. The method of claim 3, further comprising:
    in response to one of the correlation values being less than the first selected threshold, repeating the selecting a first set elements, the selecting second and third sets of elements, the determining respective correlation values, the determining a difference between the correlation value, and the associating steps using lattice patterns corresponding to a second phase alignment of the color filter array; and
    in response to the difference between the correlation values being less than the second selected threshold, repeating the selecting a first set of elements, the selecting second and third sets of elements, the determining a correlation value, the determining a difference between the correlation value, and the associating steps using lattice patterns corresponding to the second phase alignment of the color filter array.

5. The method of claim 4, further comprising:
in response to one of the correlation values of the sets of elements with the lattice patterns corresponding to the second phase alignment being less than a first selected threshold:
determining respective phase correlation values of each of the first and second phase alignments from the correlation values of the sets of elements corresponding to each phase alignment; and
associating the first set of elements corresponding to the phase alignment having the largest phase correlation value with the quincunx lattice of the color filter array; and
in response to the difference between the correlation value of sets of elements with lattice patterns corresponding to the second phase alignment being less than the second selected threshold:
determining a phase correlation value of each of the first and second phase alignments from the correlation values of the sets of elements corresponding to each phase alignment; and
associating the first set of elements corresponding to the phase alignment having the largest correlation with the quincunx lattice of the color filter array.

6. The method of claim 3, wherein the determining respective correlation values for each of the first, second, and third sets of elements includes determining respective sums of absolute differences for each of the first, second, and third sets of elements.

7. The method of claim 3, further comprising smoothing sample values of image data corresponding to elements of each lattice to de-emphasize high frequency components.

8. The method of claim 1, wherein determining second and third color components corresponding to elements of the first and second rectangular lattices includes:
performing interpolation of the image data frame to produce pixel data using first and second initial color components for respective first and second rectangular lattices;
transforming pixel data to a color space encoding;
comparing the pixel data to first and second gamuts of the color space, the second gamut having first and second initial color components interchanged;
determining a distribution of pixel data within the color space of each of the first and second gamuts;
in response to the first gamut having a greater distribution of pixel data, selecting the first and second initial color components for use as respective second and third color components; and
in response to the second gamut having a greater distribution of pixel data, selecting the second and first initial color components for use as respective second and third color components.

9. The method of claim 1, wherein: determining second and third color components corresponding to elements of the first and second rectangular lattices includes:
performing interpolation of the input frame of image data to produce pixel data using first and second initial color components for respective first and second rectangular lattices;
transforming the pixel data to a color space encoding according to a first phase alignment;
selecting a reference color component and two comparison color components from a group consisting of the first color component, the first initial color component, and the second initial color component;
comparing the comparison components to the color space encoding of pixel data to create a mask of the reference color component;
masking each color component of the pixel data of the input frame of image data with the mask of the reference component;
determining a respective first distribution pattern for each masked color component; and
in response to the first distribution patterns matching a first phase distribution pattern, selecting the first and second initial color components for use as respective second and third color components.

10. The method of claim 9, further comprising in response to the distribution patterns being inconsistent with the first phase distribution pattern:
transforming the pixel data to a color space encoding according to a second phase alignment;
selecting a second reference color component and two second comparison color components from the group;
comparing the second comparison components to the color space encoding of the pixel data to create a second mask;
masking each color component of color space encoding of the pixel data with the second mask;
determining a respective second distribution pattern for each color component masked with the mask of the second reference component; and
in response to the second distribution patterns matching a second phase distribution pattern, selecting the first and second initial color components for use as respective second and third color components.

11. The method of claim 9, wherein:
the input frame of image data corresponds to a selected color pattern; and
the first phase distribution pattern indicates areas of the selected color pattern corresponding to each of the first color component and the first and second initial color components.

12. The method of claim 9, wherein
the first phase distribution pattern indicates an expected distribution of each color component for a natural image.

13. The method of claim 1, further comprising:
selecting a sub-region of the color filter array; and
wherein performance of determining, associating, selecting, interpolation, and analysis steps is limited to the sub-region of the color filter array.

14. The method of claim 13, wherein the sub-region includes adjacent elements of at least 25% of the elements of the color filter array.

15. The method of claim 1, wherein
the Bayer color filter array includes four color components; and
the quincunx lattice of the color filter array corresponds to the first and a fourth color component of the color filter array;
further comprising:
grouping elements of the quincunx lattice into third and fourth rectangular lattices; and
determining first and fourth color components corresponding to elements of the third and fourth rectangular lattices from the sample values in an input frame of image data.

16. A method for determining a phase alignment of a color filter array, the method comprising:

determining, using a processor, a plurality of mutually exclusive sets of elements of the color filter array, each set including elements corresponding to a color component of the color filter array;

performing interpolation of an image data frame to produce pixel data;

generating two or more permutations of the color components of the color filter array mapped to the mutually exclusive sets of elements;

for each permutation:
- transforming the pixel data to a color space encoding;
- selecting a reference component from the color components of the color filter array;
- generating a mask for the reference component;
- applying the mask to each color component of the color space encoding; and
- determining a distribution pattern of each masked color component; and selecting the permutation having distribution patterns closest to an expected distribution pattern.

17. The method of claim 16, further comprising in response to the distribution patterns being inconsistent with the first phase distribution pattern:

transforming the pixel data to a color space encoding according to a second phase alignment;

selecting a second reference color component and two second comparison color components from the color components of the color filter array;

comparing the second comparison components to the color space encoding of the pixel data to create a second mask;

mask each color component of color space encoding of the pixel data with the second mask;

determine a second distribution pattern for each color component masked with the mask of the second reference component; and in response to the second distribution patterns matching a second phase distribution pattern, selecting the first and second initial color components for use as respective second and third color components.

18. The method of claim 16, wherein the color filter array is a Bayer filter array having three color components.

19. The method of claim 16, wherein the color filter array is a Bayer filter array having four color components.

20. An article of manufacture, comprising a non-transitory processor-readable storage medium configured with processor-executable instructions, the instructions when executed by a processor causing a processor to perform the steps including:

determining, from sample values in an input frame of image data, sensor elements of a sensor array that correspond to a first color component in a quincunx lattice of a color filter array;

selecting elements of the color filter array corresponding to first and second rectangular lattices of the color filter array, wherein the first and second rectangular lattices are mutually exclusive from each other and from the quincunx lattice of the color filter array; and determining sensor elements of the sensor array that correspond to second and third color components of the first and second rectangular lattices from the sample values in an input frame of image data.

\* \* \* \* \*